United States Patent
Hodge et al.

(10) Patent No.: US 8,820,505 B2
(45) Date of Patent: Sep. 2, 2014

(54) PIVOT RING FOR A MANUAL CLUTCH

(75) Inventors: Michael Hodge, Creston, OH (US); Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 290 days.

(21) Appl. No.: 13/166,671

(22) Filed: Jun. 22, 2011

(65) Prior Publication Data

US 2012/0067687 A1    Mar. 22, 2012

Related U.S. Application Data

(60) Provisional application No. 61/383,481, filed on Sep. 16, 2010.

(51) Int. Cl.
*F16D 13/70* (2006.01)
*F16D 13/58* (2006.01)

(52) U.S. Cl.
USPC ..................................... 192/89.23; 192/70.27

(58) Field of Classification Search
USPC .................... 192/89.22, 89.23, 89.24, 113.23
See application file for complete search history.

(56) References Cited

U.S. PATENT DOCUMENTS 3,118,526 A * 1/1964 Wolfram ................. 192/70.19
4,095,683 A * 6/1978 Ban .......................... 192/89.23

* cited by examiner

*Primary Examiner* — Rodney Bonck
(74) *Attorney, Agent, or Firm* — Davidson, Davidson & Kappel, LLC

(57) ABSTRACT

A pivot ring for a clutch assembly which has a first annular segment, a second annular segment, and a radial segment. The first annular segment has a first face on a front side of the pivot ring and the second annular segment has a second face, predominately opposing the first face, on a back side of the ring. The radial segment is disposed between the first annular segment and the second annular segment, connecting the first annular segment and the second annular segment. The first annular segment, the second annular segment, or both the first annular segment and the second annular segment can include axial protrusions with arcuately shaped pivot portions. Preferably, in the clutch assembly, the pivot ring is disposed between the diaphragm spring and the pressure plate, allowing for rotational freedom between the pressure plate and the diaphragm spring.

17 Claims, 13 Drawing Sheets

PIVOT RING FOR A MANUAL CLUTCH

This application claims the priority of U.S. Provisional Patent Application Nos. 61/330,714 filed May 3, 2010 and 61/383,481 filed Sep. 16, 2010, the contents of both applications are incorporated by reference herein.

FIELD OF THE INVENTION

The invention relates generally to a clutch assembly and more specifically to a pivot ring for a clutch assembly used in self-adjusting and non-adjusting clutches.

BACKGROUND OF THE INVENTION

Self-adjusting and non-adjusting clutches are known. These clutches typically have a single pivoting connection between a pressure plate and a diaphragm spring. When a high energy event occurs in the clutch, it results in a high temperature gradient throughout the pressure plate. This causes the pressure plate to distort from a flat or concave shape to a convex shape creating a geometrical height change at the connection between the pressure plate and the diaphragm spring which results in a lower operating point of the clutch. The change in the operating point causes lower working loads and less torque capacity of the clutch. Moreover, the change in the height of the diaphragm spring causes lower working loads and less torque capacity of the clutch. Furthermore, the change in the height of the fingers of the diaphragm spring can cause issues at the vehicle system level, such as the clutch pedal not returning when the operator tries to re-engage the clutch.

One example of a self-adjusting clutch is shown, for example, in U.S. Pat. No. 6,405,846, the entire disclosure of which is hereby incorporated by reference. Other examples of self-adjusting clutches are shown, for example, in U.S. Pat. Nos. 4,207,972 and 4,228,883.

The self-adjusting clutch of U.S. Pat. No. 6,405,846, for example, is a friction clutch with a pressure plate that is axially movably, but non-rotatably coupled to a cover and is biased by a diaphragm spring to urge the friction linings of a clutch disc against a flywheel. The design is intended to ensure that when the friction clutch is engaged, the diaphragm spring remains at least nearly constantly biased upon the pressure plate regardless of the wear upon the friction linings and other parts.

Additionally, the self-adjusting clutch of U.S. Pat. No. 4,207,972, for example, discloses an automatic wear compensator, or rotatable pivot ring, for a clutch to compensate for normal wear of the clutch's frictions faces. The pivot ring is operatively connected to a pressure plate and adjusted through a series of camming surfaces on the pressure plate.

Moreover, the self-adjusting clutch of U.S. Pat. No. 4,207, 972, for example, discloses an automatic wear adjuster, or pivot ring, for clutches to compensate for wear of the clutch's friction faces during use. The automatic wear adjuster includes an advancing ring which abuts a pressure plate, a fulcrum ring which is placed on top of the advancing ring, and an actuator mechanism. A series of camming surfaces are formed on the rings to adjust the distance between the surface of the clutch disc and the engaging surface of the pressure plate and a surface of a fulcrum ring.

SUMMARY OF THE INVENTION

The present invention is directed to a pivot ring for a clutch assembly which provides rotational freedom between a pressure plate and a diaphragm spring in a clutch assembly by interfacing with the pressure plate at one end and the diaphragm spring at the other end. The rotational freedom allows for consistent operation of the clutch in high energy events. The pivot ring also minimizes the change of the height of the diaphragm spring during high speed events.

Broadly, the present invention can be defined as a pivot ring for a clutch which comprises a first annular segment, a second annular segment, and a radial segment. The first annular segment has a first face on a front side of the ring and the second annular segment has a second face, predominately opposing the first face, on a back side of the ring. The radial segment is disposed between the first annular segment and the second annular segment, connecting the first annular segment and the second annular segment.

At least the first and second annular segments can have protrusions. Additionally, at least the first and the second annular segments can have axially extending pivotable portions which can be, for example, arcuately shaped, triangularly shaped, hyperbolically shaped, or have an oval shape.

At least one of the first and second annular segments can have an unbroken outer periphery.

The first and second annular segments can be of different lengths. For example, the second annular segment can be shorter than the first annular segment.

Additionally, the first annular segment can be radially offset outwardly from the second annular segment.

Alternatively, the present invention can be defined as clutch which comprises a pressure plate that has a recess, a diaphragm spring, and a pivot ring disposed between the pressure plate and the diaphragm spring. The pivot ring can have a first annular segment, a second annular segment and a radial segment. The first annular segment can have a first face on a front side of the ring, which contacts the diaphragm spring and the second annular segment can have a second face, which contacts the pressure plate, predominately opposing the first face, on a back side of the ring. The radial segment can be disposed between the first annular segment and the second annular segment, connecting the first annular segment and the second annular segment.

At least the first and the second annular segments can have protrusions. Additionally, at least one of the first and the second annular segments can have axially extending pivotable portions. The portions can be, for example, arcuately shaped, triangularly shaped, hyperbolically shaped, or have an oval shape.

At least the first and the second annular segments can have an unbroken outer periphery.

The first and second annular segments can be of different lengths. For example, the second annular segment can be shorter than the first annular segment.

The first annular segment can be radially offset outwardly from the second annular segment.

The pressure plate can have a recess. Also, the pressure plate can have a radial friction surface which is engageable with a clutch disk and transmits torque to a transmission of a vehicle and axially opposing the radial friction surface, the pressure plate has at least a first surface which is separated from at least a second surface by the recess. The radial friction surface and the first surface and the second surface taper when the pressure plate is overheated with the pivot ring contactable with the pressure plate proximately at the recess.

The recess, which is located between the first surface and the second surface, has a first wall extending downward from the first surface, a second wall extending radially inward from the first side wall, toward an axis of rotation of the clutch assembly, a groove formed at an axially innermost edge of the second wall, and a third wall extending away from the groove, toward the second surface. Additionally, at least the radial segment can be disposed within the recess and the second annular segment can be disposed within the groove of the recess.

The pivot ring can transmit an axial force from the diaphragm spring onto the pressure plate.

The clutch assembly can further comprise a sensor ring with apertures and the axially extending projections of the first annular segment can project through the apertures in the sensor ring.

BRIEF DESCRIPTION OF THE DRAWINGS

The present invention will be more fully described in the following detailed description of the invention taken in conjunction with the accompanying drawing figures, in which.

DETAILED DESCRIPTION OF THE INVENTION

At the outset, it should be appreciated that like drawing numbers appearing in different drawing views identify identical, or functionally similar, structural elements. Furthermore, it should be understood that the invention is not limited only to the particular embodiments, methodologies, materials, and modifications described herein and, as such, may vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art. Although any methods, devices, or materials similar or equivalent to those described herein can be used in the practice or testing of the invention, the following example methods, devices, and materials are now described.

Figure 1A:
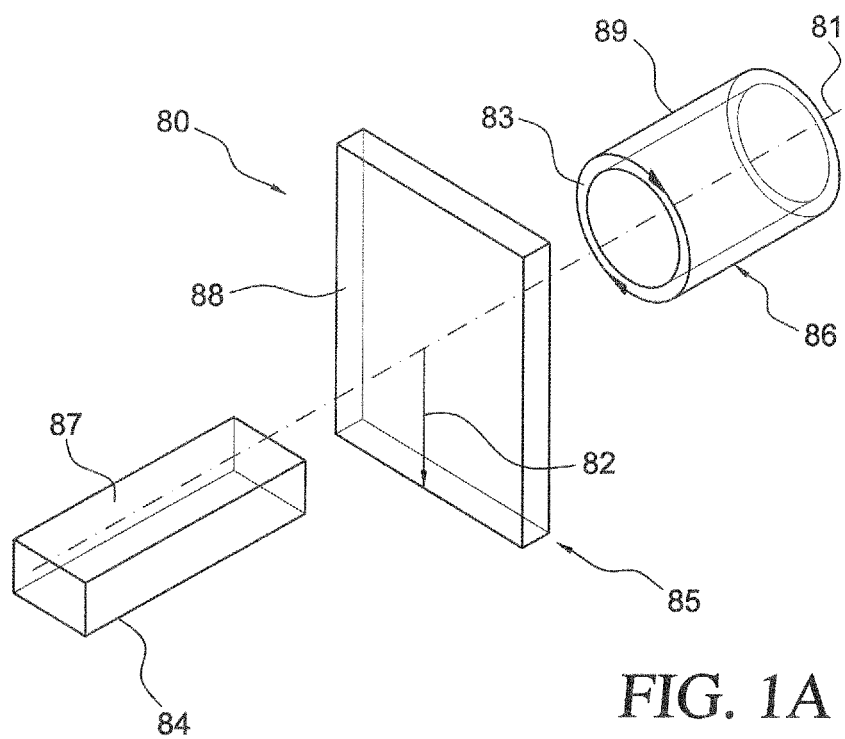
FIG. 1A is a perspective view of cylindrical coordinate system demonstrating spatial terminology used in the present invention.

FIG. 1A is a perspective view of a cylindrical coordinate system 80 demonstrating spatial terminology used in the present invention. The present invention is at least partially described within the context of a cylindrical coordinate system. The system 80 has a longitudinal axis 81 used as the reference for the directional and spatial terms that follow. The adjectives "axial," "radial," and "circumferential" are with respect to an orientation parallel to an axis 81, a radius 82 (which is orthogonal to the axis 81), and a circumference 83, respectively. The adjectives "axial," "radial," and "circumferential" also are regarding orientation parallel to respective planes. To clarify the disposition of the various planes, objects 84, 85, and 86 are used. A surface 87 of the object 84 forms an axial plane. That is, the axis 81 forms a line along the surface. A surface 88 of the object 85 forms a radial plane. That is, the radius 82 forms a line along the surface. A surface 89 of the object 86 forms a circumferential plane. That is, the circumference 83 forms a long along the surface. As a further example, axial movement or disposition is parallel to the axis 81, radial movement or disposition is parallel to the radius 82, and the circumferential movement or disposition is parallel to the circumference 83. Rotation is with respect to the axis 81.

The adverbs "axially," "radially," and "circumferentially" are with respect to an orientation parallel to the axis 81, the radius 82, or the circumference 83, respectively. The adverbs "axially," "radially," and "circumferentially" are also in reference to orientation parallel to respective planes.

Figure 1B:
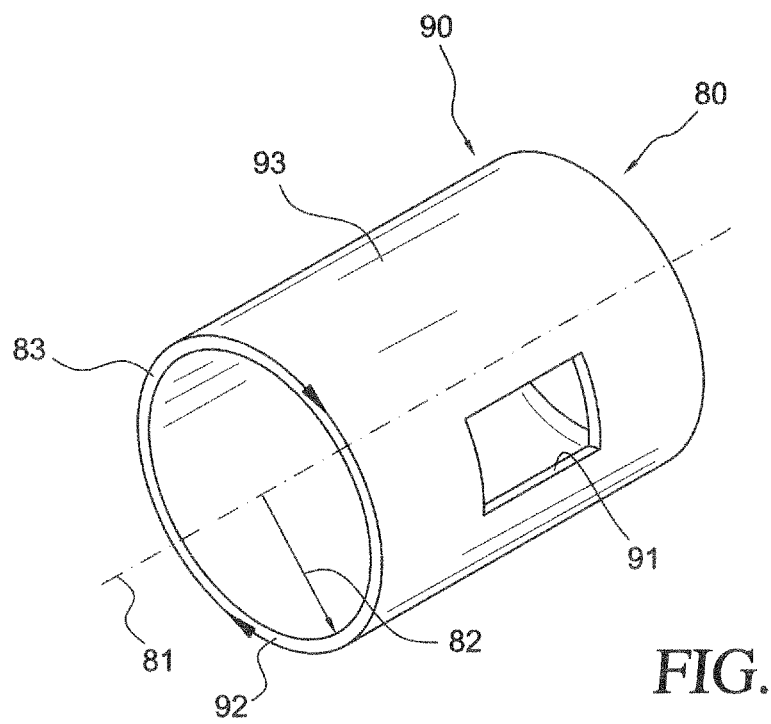
FIG. 1B is a perspective view of an object of the cylindrical coordinate system of FIG. 1A demonstrating spatial terminology used in the present invention.

FIG. 1B is a perspective view of an object 90 in the cylindrical coordinate system 80 of FIG. 1A demonstrating spatial terminology used in the present invention. The cylindrical object 90 is representative of a cylindrical object in a cylindrical coordinate system and is not intended to limit the present invention in any manner. The object 90 includes an axial surface 91, a radial surface 92, and a circumferential surface 93. The surface 91 is part of an axial plane, the surface 92 is part of a radial plane, and the surface 93 is part of a circumferential plane.

Figure 2:
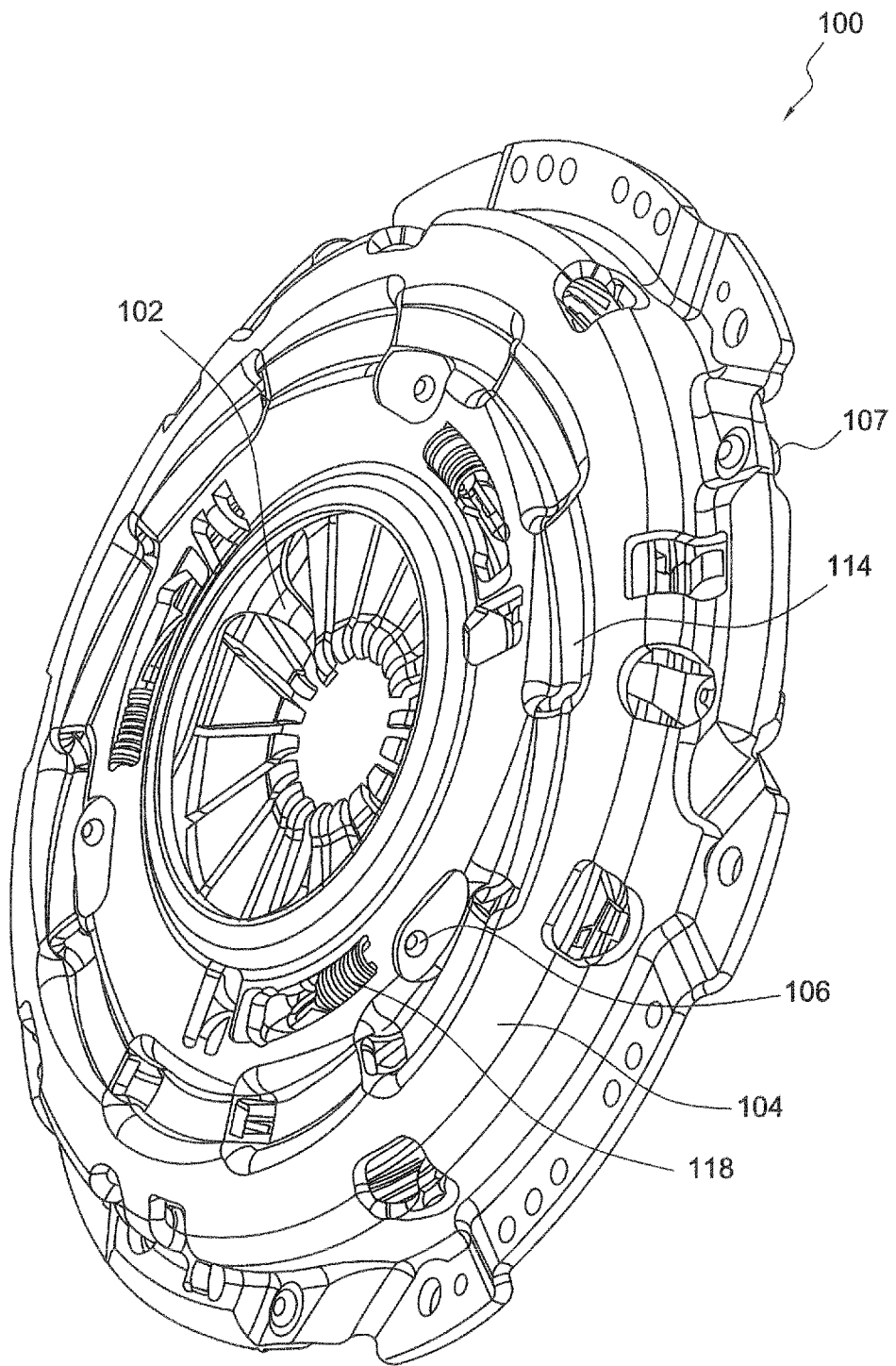
FIG. 2 is a perspective view of the back side of a clutch assembly of one embodiment of the present invention.
Figure 3:
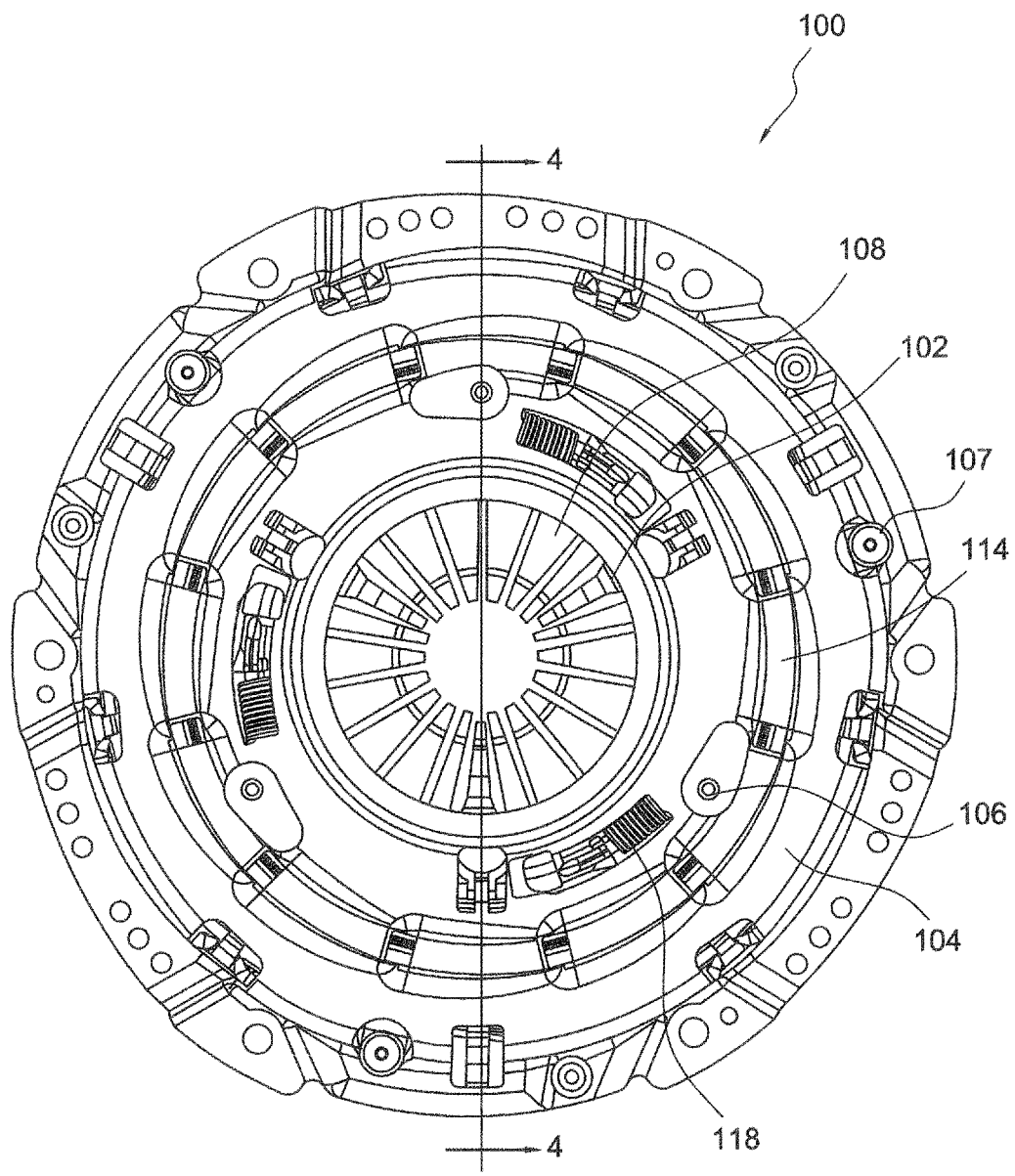
FIG. 3 is a back view of the clutch assembly of FIG. 2.

Reference is made to FIGS. 2-5 in describing an example embodiment of the present invention. FIG. 2 illustrates a perspective view of the back side of a clutch assembly 100. FIG. 3 illustrates a back view of the clutch assembly 100. As shown, a compensation spring 102 is fixed to a clutch cover 104 via fasteners 106, such as rivets. The fasteners 106 extend through apertures in a diaphragm spring 108 to provide proper positioning and prevent rotation of the diaphragm spring 108 relative to the clutch cover 104. The fasteners 106 further center an adjuster ring 110 (See, FIGS. 4-5) relative to the cover 102. The adjuster ring 110 includes ramps 112 (See, FIG. 5) matingly engaged with cover ramps 114. The ramps 112, 114 cooperate with a sensor spring 116 (See, FIG. 5) and coil springs 118 to adjust the clutch assembly 100 as is commonly known in the art.

Figure 4:
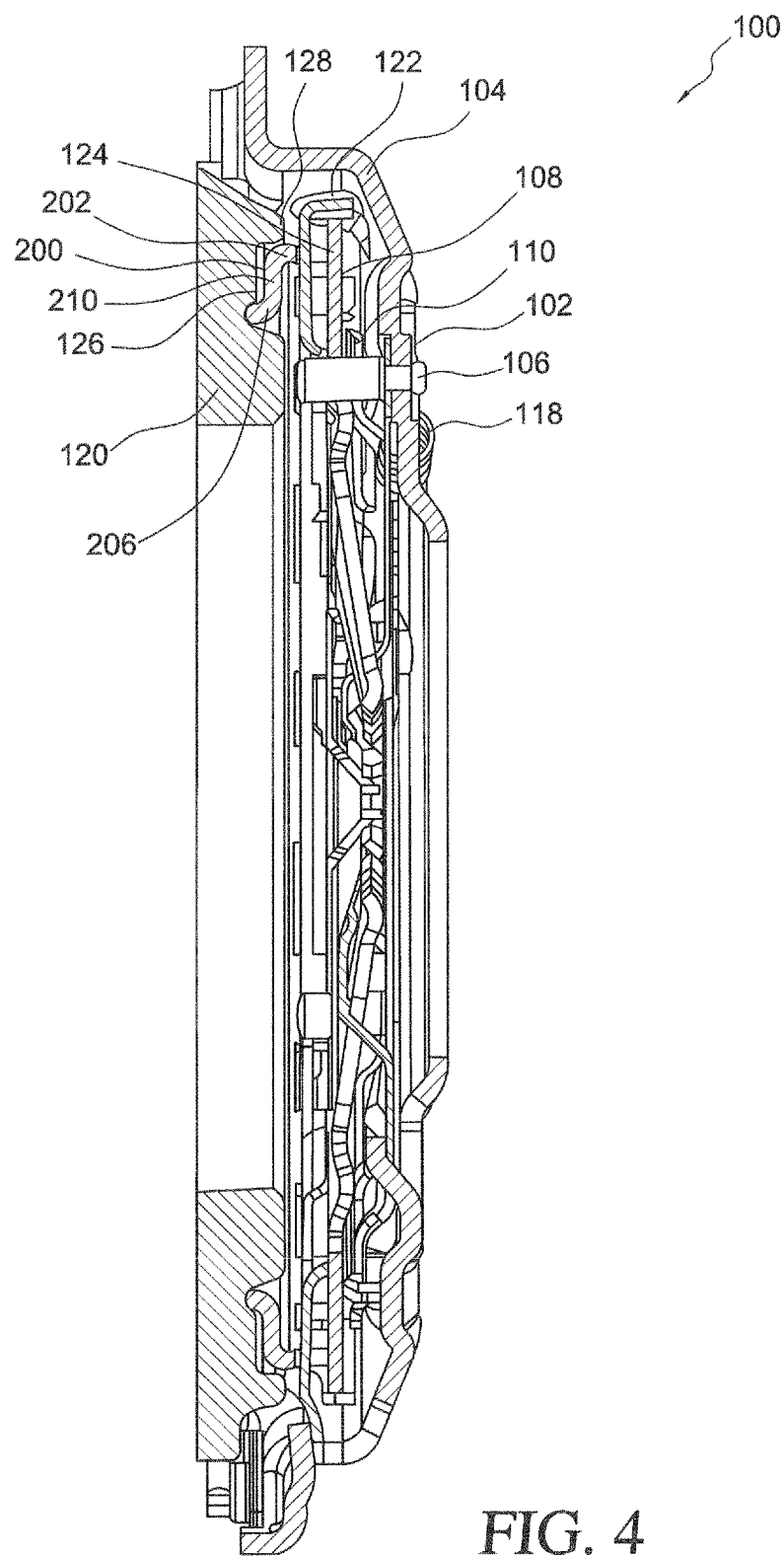
FIG. 4 is a cross-sectional view of the clutch assembly of FIG. 2 taken generally along line 4-4 in FIG. 3.

FIG. 4 illustrates a sectional view of the clutch assembly 100 taken along line 3-3 in FIG. 3. The clutch assembly 100 includes the clutch cover 104 which is rotationally fixed to a pressure plate 120 via fasteners 107 (See, FIG. 3). The phrase "rotationally fixed" means that the clutch cover 104 and the pressure plate 120 rotate together, but may be free to move in other directions. For example, the pressure plate 120 may be free to move axially relative to the clutch cover 104 to clamp a clutch disk (not shown) against a flywheel (not shown). Between the clutch cover 104 and the pressure plate 120, the clutch assembly 100 includes the coil spring 118, the adjuster ring 110, the compensation spring 102, the diaphragm spring 108, the sensor spring 116, a pivoting ring 200, and leaf springs 122 (See, FIG. 5). However, the clutch assembly 100 is not limited only to the components noted herein.

As shown in FIG. 4, the pivot ring 200 is disposed between the diaphragm spring 108 and the pressure plate 120, providing a pivotable interface between the diaphragm spring 108 and the pressure plate 120. The pivotable interface creates spacing between the diaphragm spring 108 and the pressure plate 120, alleviating direct contact between the diaphragm spring 108 and the pressure plate 120, and the pivotable interface allows for independent movement of the diaphragm spring 108 relative to the pressure plate 120 and vice versa. Specifically, a pivotable first annular segment 202 of the pivot ring 200 is disposed near an outer face 124 of the diaphragm spring 108, a pivotable second annular segment 206 of the pivot ring 200 is generally disposed in a recess 126 of the pressure plate 120, and a radial segment 210 is disposed predominately in the recess 126 of the pressure plate 120 as well. Clutch liftoff is advantageously increased with the pivot ring 200 contacting the diaphragm spring 108 near the outer face 124 because the outer face 124 experiences increased travel compared with other portions of the diaphragm spring 108 when the clutch is engaged and disengaged.

During engagement of the clutch, the diaphragm spring 108 exerts a force against the pivot ring 200. The pivot ring 200 presses against the pressure plate 120 to clamp the clutch disk between the pressure plate 120 and the flywheel. The force of the diaphragm spring 108 is reacted through fasteners (not shown) from the clutch cover 104 onto the flywheel. The pivot ring 200 advantageously repositions a typical contact point of the diaphragm spring 108 from a first surface 128 of the pressure plate 120 to the first annular segment 202 of the pivot ring 200, lessening the effect of the taper of the pressure plate 120 on the operation of the clutch assembly 100. That is, the pivot ring 200 contacts the pressure plate 120 proximately in the recess 126 of the pressure plate 120.

Figure 5:
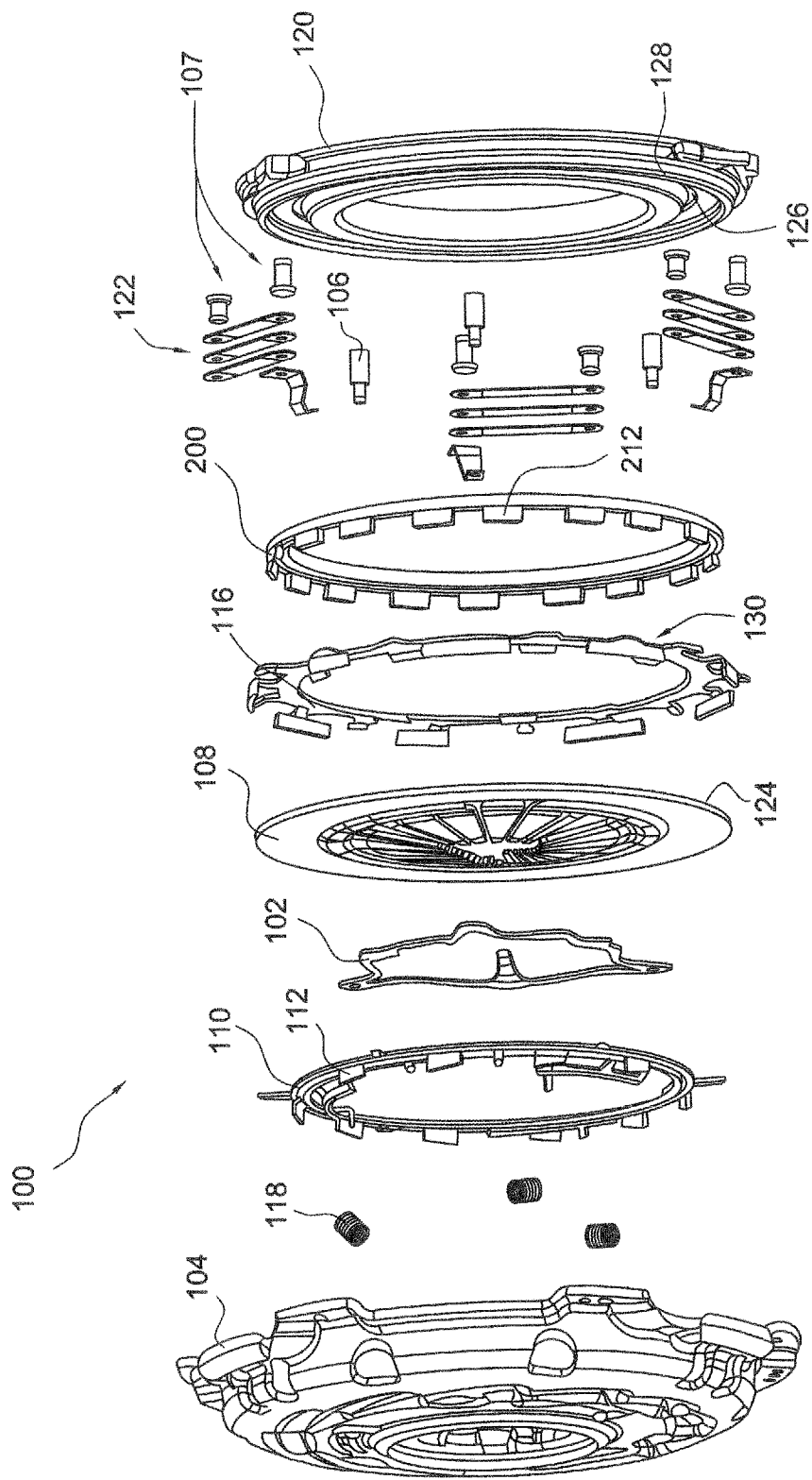
FIG. 5 is an exploded view of the clutch assembly of FIG. 2.

FIG. 5 illustrates an exploded view of the clutch assembly 100 of FIG. 2. The components of the clutch assembly 100 have been described above in reference to FIG. 4. As can be seen in FIG. 5, the pivot ring 200 is disposed between the pressure plate 120 and the diaphragm spring 108. Between the pivot ring 200 and the diaphragm spring is the sensor ring 116 which has openings 130 through which protrusions 212 of the pivot ring 200 project.

Figure 6:
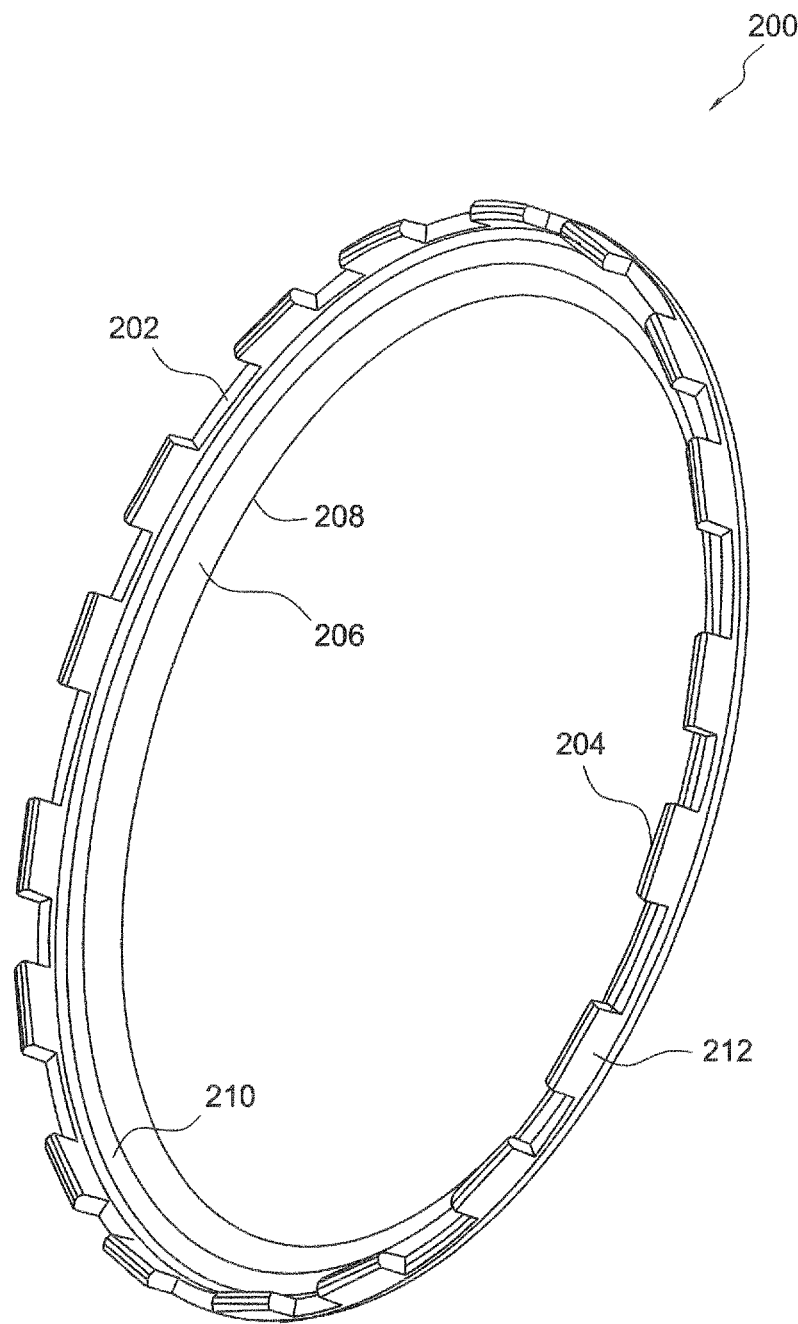
FIG. 6 is a perspective view of one embodiment of the pivot ring of the present invention.

FIG. 6 illustrates a perspective view of one embodiment of the pivot ring 200. The pivot ring 200 includes the first annular segment 202 and a first pivot portion 204. The pivot ring 200 also includes the second annular segment 206 with a second pivot portion 208. Connecting the first annular segment 202 and the second annular segment 206 is the radial segment 210. As shown, the first annular segment 202 can include a plurality of axial protrusions 212. Additionally, as shown, the first pivot portion 204 and the second pivot portion 208 are arcuately shaped. However, the first pivot portion 204 and/or the second pivot portion 208 can be of any shape. For example, the first pivot portion 204 and the second pivot portion 208 can be triangular, hyperbolic, oval, or convex. Similarly, the first pivot portion 204 and the second pivot portion 208 may comprise a combination of shapes, including straight segments.

Figure 7:
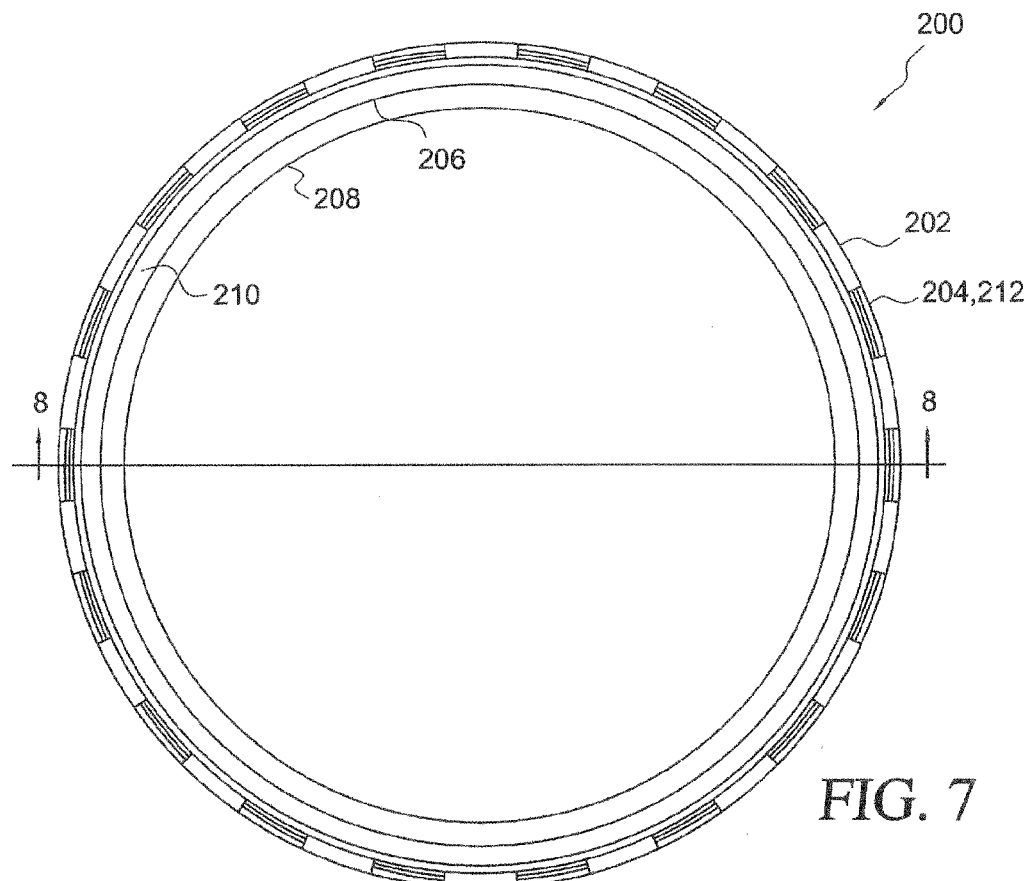
FIG. 7 is a back view of the pivot ring of FIG. 6.

FIG. 7 illustrates a back view of the pivot ring 200. As shown, the first annular segment 202 can have a larger diameter than the second annular segment 206 with the radial segment 210 connecting the first annular segment 202 and the second annular segment 206. The pivot ring 200 can, for example, be stamped and extruded with the pivot portions 204, 208 either machined or stamped into the first annular segment 202 and the second annular segment 206, respectively.

Figure 8:
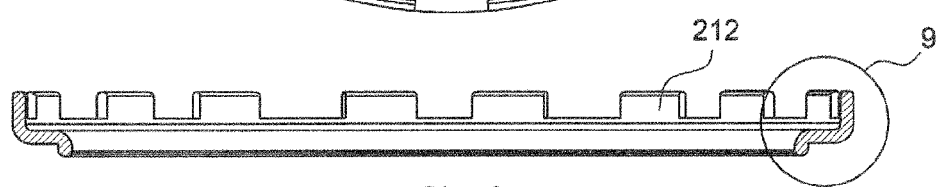
FIG. 8 is a cross-sectional view of the pivot ring of FIG. 6 taken generally along line 8-8 in FIG. 7.

FIG. 8 is a sectional view of the pivot ring 200 taken along line 8-8 in FIG. 7. The protrusions 212 are distributed around the periphery of the first annular segment 202 forming notches or recesses. Also, the radial segment 210 provides spacing between the first annular segment 202 and the second annular segment 206 forming a non-uniform contour where the first annular segment 202 is disposed outside of the second annular segment 206.

Figure 9:
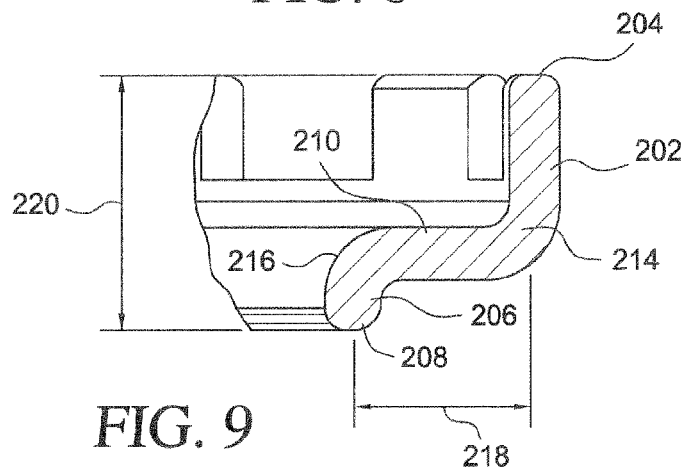
FIG. 9 is a view illustrating detail 9 of FIG. 8.

FIG. 9 illustrates the detail 9 of FIG. 9. The detail shows the predominately opposing arcuately shaped pivot portions 204, 208 of the pivot ring 200. Further shown is the first annular segment 202, the radial segment 210 and the second annular segment 206. The first annular segment 202, the radial segment 210, and the second annular segment 206 blend at curved segments 214, 216 to form a single element, the pivot ring 200. The first annular segment 202 can be disposed radially outside of the second annular segment 206 by a distance 218. Also, the first annular segment 202 can be axially offset from the second annular segment 206 by a distance 220. Further, the second annular segment 206 can be shorter than the first annular segment 202, such that the first annular segment 202 extends further in the axial direction than the second annular segment 206.

Figure 10:
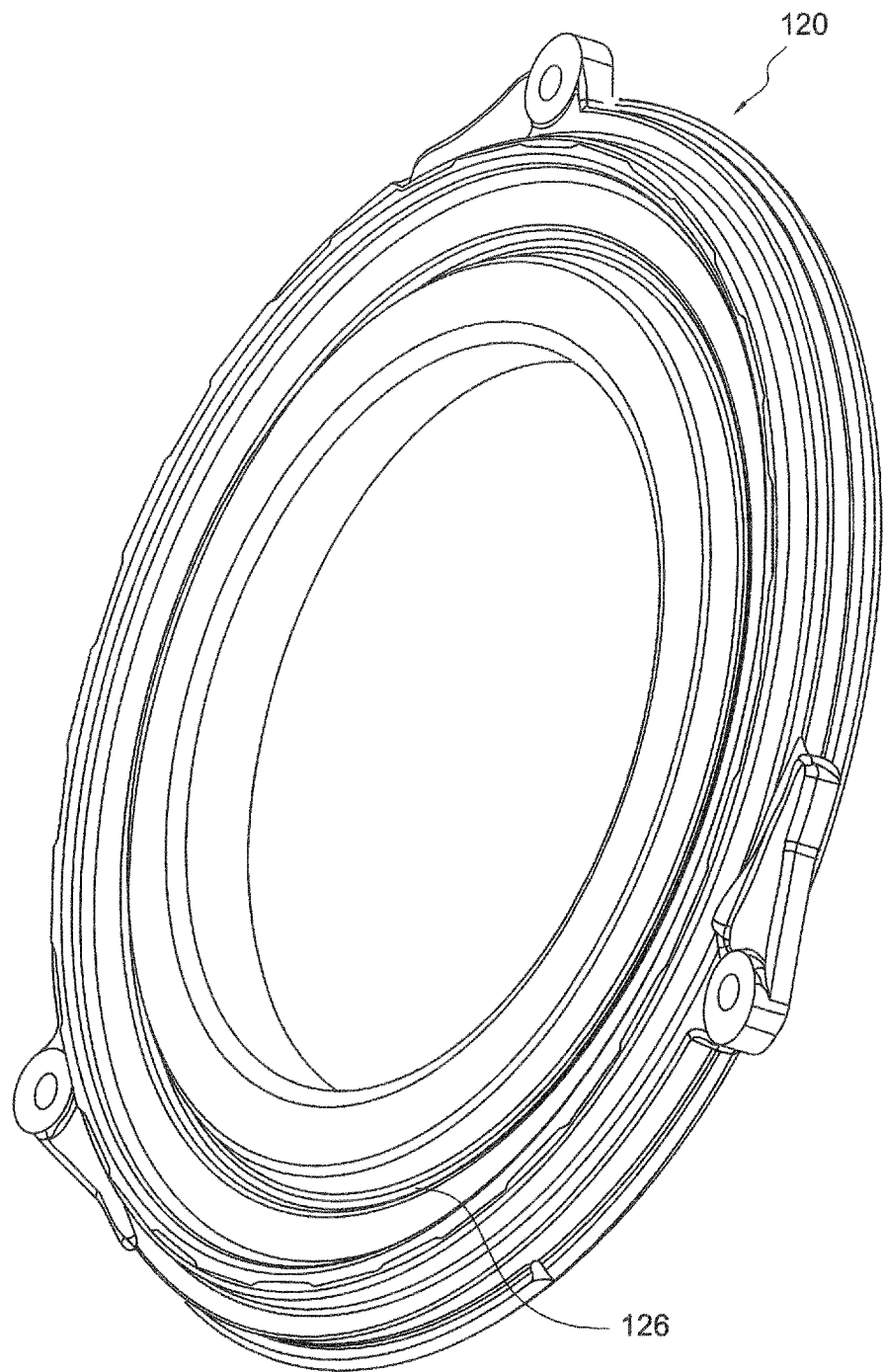
FIG. 10 is a perspective view of the back side of a pressure plate according to one embodiment of the present invention.
Figure 11:
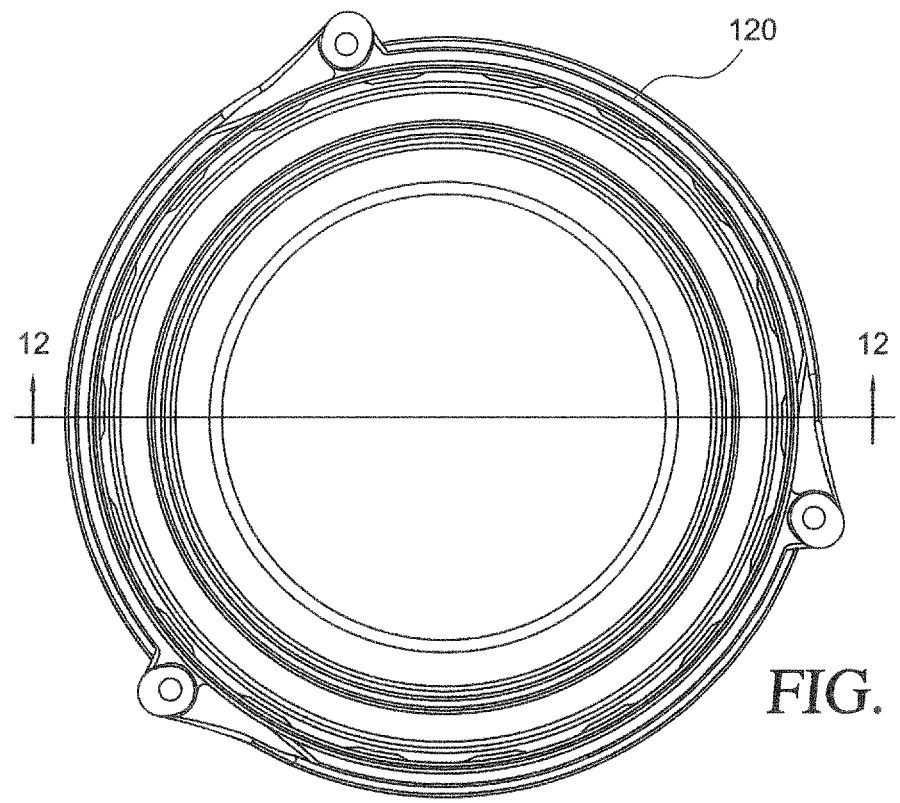
FIG. 11 is a back view of the pressure plate of FIG. 10.

FIGS. 10-11 illustrate the pressure plate 120. As shown, the recess 126 of the pressure plate 120 is interfaced with the pivot portion 200 of the second annular segment 206 of the pivot ring 200.

Figure 12:
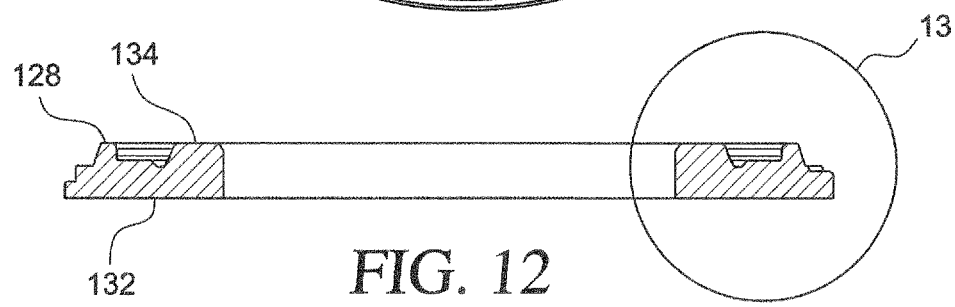
FIG. 12 is a cross-sectional view of the pressure plate of FIG. 10 taken generally along line 12-12 in FIG. 11.

FIG. 12 is a section view of the pressure plate 120 taken generally along line 12-12 in FIG. 11.

Figure 13:
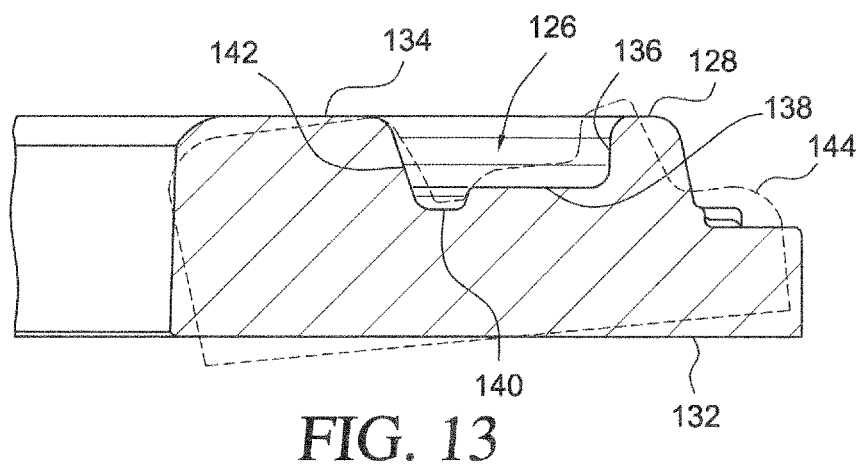
FIG. 13 is a view illustrating detail 13 of FIG. 12.

FIG. 13 illustrates the detail 13 of the pressure plate 120 of FIG. 12. The pressure plate 120 includes a radial friction surface 132 for engaging a clutch disc (not shown) for transmitting torque from an engine (not shown) to a transmission (not shown) for a vehicle (not shown). The pressure plate 120 further includes the first surface 128 and a second surface 134 which are each axially opposed to the friction surface 132. Between the first surface 128 and the second surface 134, is the recess 126 in which the pivot ring 200 interfaces with the pressure plate 120. The recess 126 can, for example, have a first wall 136, which extends downward (as shown in FIG. 13) from the first surface 128, a second wall 138 extending radially inward from the first wall 136, toward an axis of rotation of the pressure plate 120, a groove 140 formed at an axially innermost edge of the second wall 138, and a third wall 142 extending away from the groove 140, toward the second surface 134.

When the pressure plate 120 is heated, the pressure plate surfaces can taper, as indicated by the dashed lines 144 in FIG. 13. That is, when the clutch is not fully engaged and the disk (not shown) slips between the pressure plate 120 and the flywheel, the engine energy is dissipated into heat and the pressure plate 120 may become overheated. The rotational freedom provided by the pivot ring 200 between the diaphragm spring 108 and the pressure plate 120 keeps the operation of the clutch consistent during high energy events that cause the pressure plate 120 to quickly reach high temperatures.

As previously discussed, the radial segment 210 of the pivot ring 200 advantageously contacts the pressure plate 120 in the recess 126 of the pressure plate 120. More specifically, the pivot ring 200 can contact the pressure plate 120 in the groove 140 of the recess 126, which advantageously positions the pivot ring 200. That is, the pivot ring 200 is centered by the groove 140 of the recess 126 to prevent imbalance of the clutch assembly 100 and assure that the pivot ring 200 is contacting the diaphragm spring 108 at the desired diameter. Contact with the diaphragm spring 108 is critical to assure proper clutch characteristics.

Figure 14:
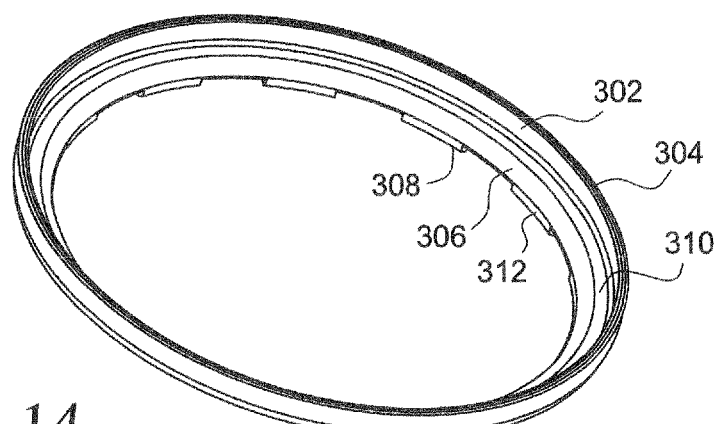
FIG. 14 is a perspective view of another embodiment of the pivot ring of the present invention.

FIG. 14 illustrates a perspective view of a further embodiment of a pivot ring 300. The pivot ring 300 includes the first annular segment 302 and a first pivot portion 304. The pivot ring 300 also includes the second annular segment 306 with a second pivot portion 308. Connecting the first annular segment 302 and the second annular segment 306 is the radial segment 310. As shown, the second annular segment 306 can include a plurality of axial protrusions 312. Additionally, as shown, the first pivot portion 304 and the second pivot portion 308 are arcuately shaped. However, the first pivot portion 304 and/or the second pivot portion 308 can be of any shape. For example, the first pivot portion 304 and the second pivot portion 308 can be triangular, hyperbolic, oval, or convex. Additionally, the first pivot portion 304 and the second pivot portion 308 may comprise a combination of shapes.

Figure 15:
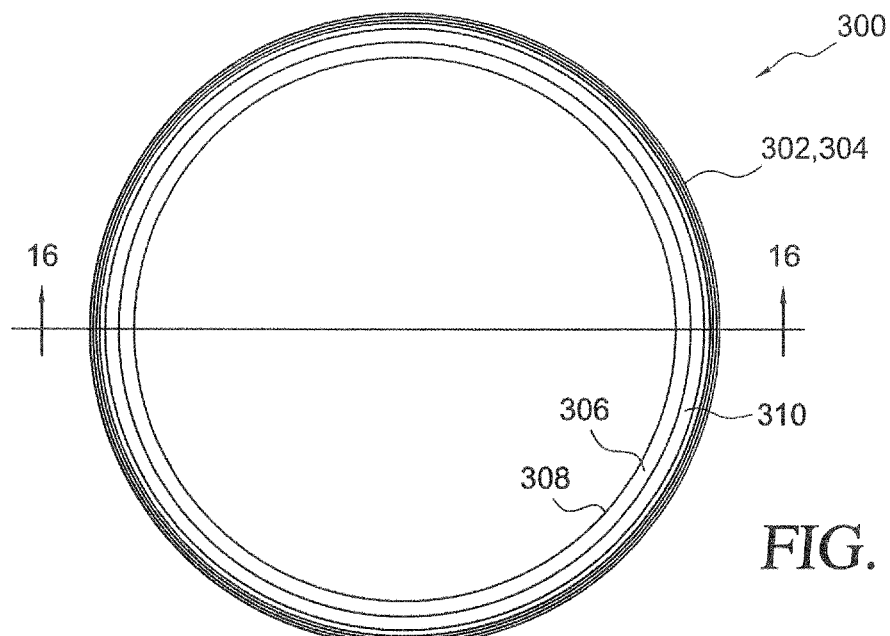
FIG. 15 is a back view of the pivot ring of FIG. 14.

FIG. 15 illustrates a back view of the pivot ring 300. As shown, the first annular segment 302 can have a larger diameter than the second annular segment 306 with the radial segment 310 connecting the first annular segment 302 and the second annular segment 306. The pivot ring 300 can, for example, be stamped and extruded with the pivot portions 304, 308 either machined or stamped into the first annular segment 302 and the second annular segment 306, respectively.

Figure 16:
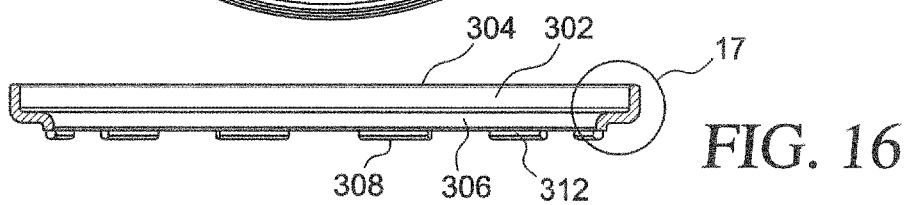
FIG. 16 is a cross-sectional view of the pivot ring of FIG. 14 taken generally along line 16-16 in FIG. 15.

FIG. 16 is a sectional view of the pivot ring 300 taken along line 16-16 in FIG. 15. The protrusions 312 are distributed around the periphery of the second annular segment 306 forming notches or recesses. Also, the radial segment 310 provides spacing between the first annular segment 302 and the second annular segment 306 forming a non-uniform contour where the first annular segment 302 is disposed outside of the second annular segment 306.

Figure 17:
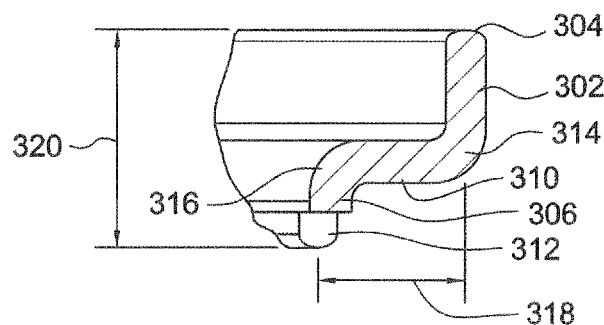
FIG. 17 is a view illustrating detail 17 of FIG. 16.

FIG. 17 illustrates the detail 17 of FIG. 16. The detail shows the predominately opposing arcuately shaped pivot portions 304, 308 and the protrusions 312 of the pivot ring 300. Further shown is the first annular segment 302, the radial segment 310 and the second annular segment 306. The first annular segment 302, the radial segment 310, and the second annular segment 306 blend at curved segments 314, 316 to form a single element, the pivot ring 300. The first annular segment 302 can be disposed radially outside of the second annular segment 306 by a distance 318. Also, the first annular segment 302 can be axially offset from the second annular segment 306 by a distance 320. Further, the second annular segment 306 can be shorter than the first annular segment 302, such that the first annular segment 302 extends further in the axial direction than the second annular segment 306.

Figure 18:
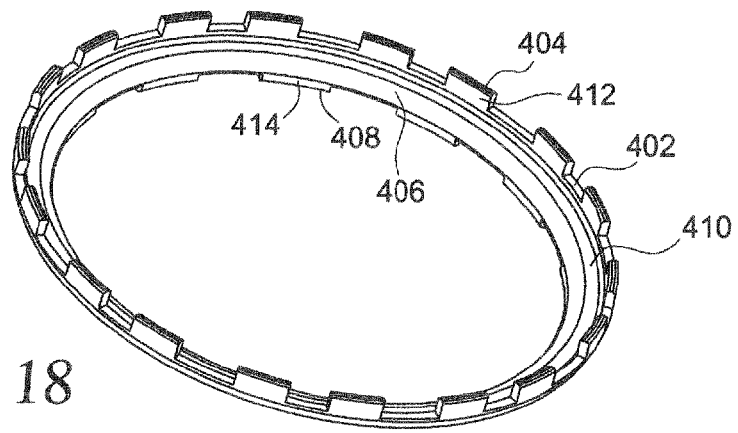
FIG. 18 is a perspective view of yet another embodiment of the pivot ring of the present invention.
Figure 22:
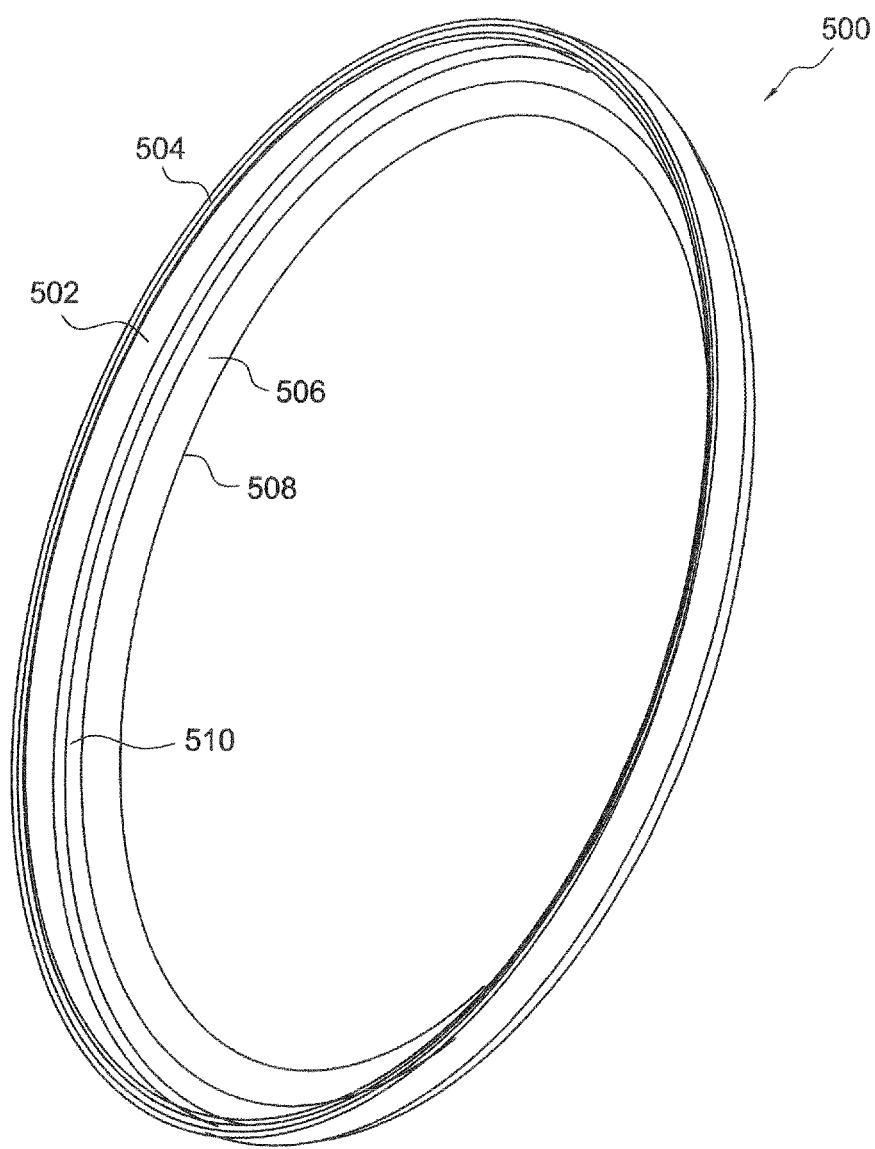
FIG. 22 is a perspective view of an alternate embodiment of a pivot ring.
Figure 23:
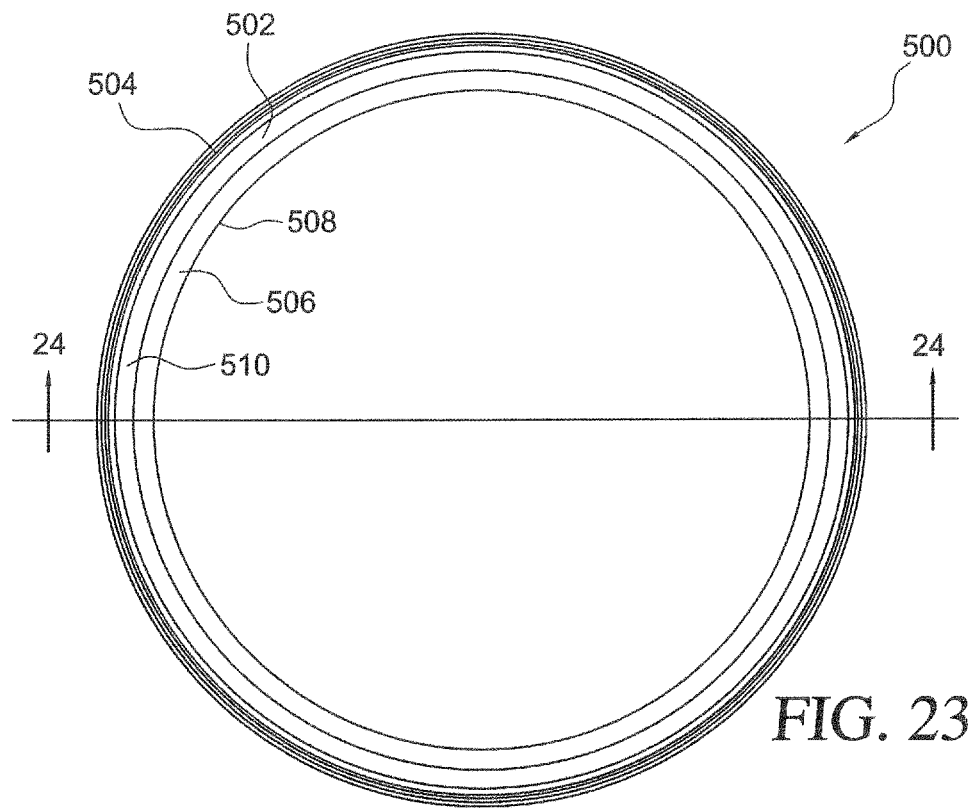
FIG. 23 is a back view of the pivot ring of FIG. 22.
Figure 24:
FIG. 24 is a cross-sectional view of the pivot ring of FIG. 22 taken generally along line 24-24 in FIG. 23.
Figure 25:
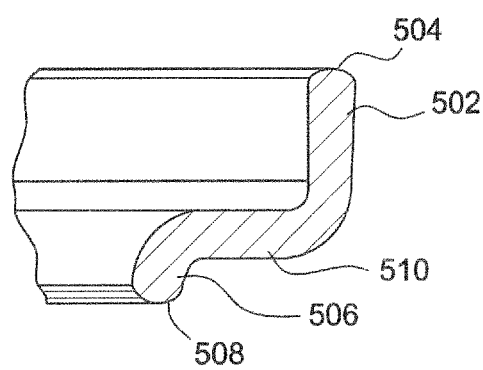
FIG. 25 is a view illustrating detail 25 of FIG. 24.

FIG. 18 illustrates a perspective view of yet another embodiment of a pivot ring 400. The pivot ring 400 includes the first annular segment 402 and a first pivot portion 404. The pivot ring 400 also includes the second annular segment 406 with a second pivot portion 408. Connecting the first annular segment 402 and the second annular segment 406 is the radial segment 410. As shown, the first annular segment can include a plurality of axial protrusions 412 and the second annular segment 406 can also include a plurality of axial protrusions 414. Additionally, as shown, the first pivot portion 404 and the second pivot portion 408 are arcuately shaped. However, the first pivot portion 404 and/or the second pivot portion 408 can be of any shape. For example, the first pivot portion 404 and the second pivot portion 408 can be triangular, hyperbolic, oval, or convex. Additionally, the first pivot portion 404 and the second pivot portion 408 may comprise a combination of shapes.

Figure 19:
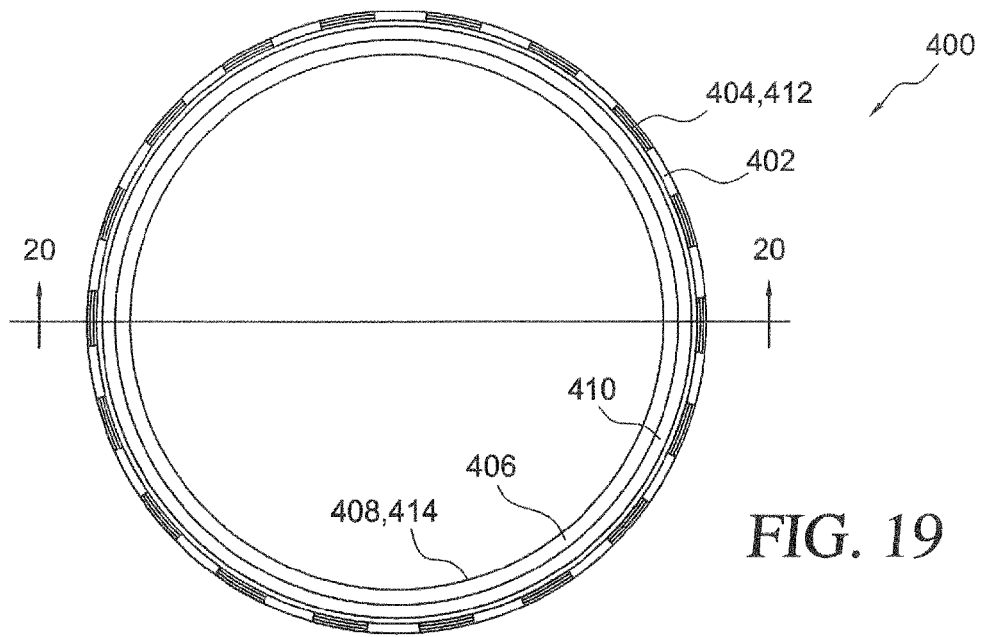
FIG. 19 is a back view of the pivot ring of FIG. 18.

FIG. 19 illustrates a back view of the pivot ring 400. As shown, the first annular segment 402 can have a larger diameter than the second annular segment 406 with the radial segment 410 connecting the first annular segment 402 and the second annular segment 406. The pivot ring 400 can, for example, be stamped and extruded with the pivot portions 404, 408 either machined or stamped into the first annular segment 402 and the second annular segment 406, respectively.

Figure 20:
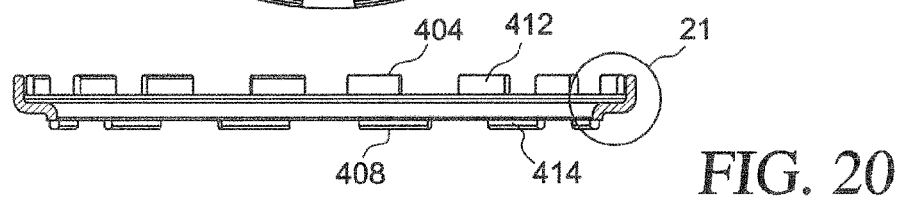
FIG. 20 is a cross-sectional view of the pivot ring of FIG. 18 taken generally along line 20-20 in FIG. 19.

FIG. 20 is a sectional view of the pivot ring 400 taken along line 20-20 of FIG. 19. The protrusions 412, 414 are distributed around the periphery of the first annular segment 402 and the second annular segment 406, respectively, forming notches or recesses. Also, the radial segment 410 provides spacing between the first annular segment 402 and the second annular segment 406 forming a non-uniform contour where the first annular segment 402 is disposed outside of the second annular segment 406.

Figure 21:
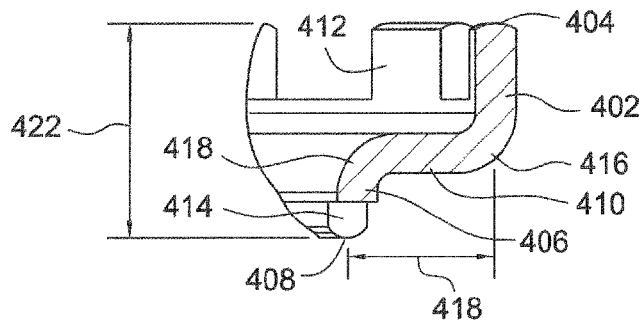
FIG. 21 is a view illustrating detail 21 of FIG. 20.

FIG. 21 illustrates the detail 21 of FIG. 20. The detail shows the predominately opposing arcuately shaped pivot portions 404, 408 and the protrusions 412, 414 of the pivot ring 400. Further shown is the first annular segment 402, the radial segment 410 and the second annular segment 406. The first annular segment 402, the radial segment 410, and the second annular segment 406 blend at curved segments 416, 418 to form a single element, the pivot ring 400. The first annular segment 402 can be disposed radially outside of the second annular segment 406 by a distance 420. Also, the first annular segment 402 can be axially offset from the second annular segment 406 by a distance 422. Further, the second annular segment 406 can be shorter than the first annular segment 402, such that the first annular segment 402 extends further in the axial direction than the second annular segment 406.

FIGS. 22-25 illustrate an alternate embodiment of a pivot ring 500. The previous discussion of the pivot ring 200 is generally applicable to this embodiment, except as indicated. The pivot ring 500 includes a first annular segment 502 with a first pivot portion 504 and a second annular segment 506 with a second pivot portion 508 that are connected by a radial segment 510. Here, the first annular segment 502 and the second annular segment 506 are both a full ring, each being an entirely uniform without protrusions. The pivot ring 500 can be used, for example, in a conventional non-adjusting clutch (not shown) which may not include the sensor spring 116. There the pivot ring 500 can be disposed adjacent to the diaphragm spring 108 without the need for protrusions.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope and spirit of the invention as claimed.

REFERENCE CHARACTERS

80 Cylindrical Coordinate System
81 Longitudinal Axis
82 Radius
83 Circumference
84 Object
85 Object
86 Object
87 Surface
88 Surface
89 Surface
90 Object
91 Axial Surface
92 Radial Surface
93 Circumferential Surface
100 Clutch Assembly
102 Compensation Spring
104 Clutch Cover
106 Fasteners
107 Fasteners
108 Diaphragm Spring
110 Adjuster Ring
112 Ramps
114 Ramps
116 Sensor Spring
118 Coil Spring
120 Pressure Plate
122 Leaf Springs
124 Outer Face
126 Recess
128 First Surface
130 Openings
132 Radial Friction Surface
134 Second Surface
136 First Wall
138 Second Wall
140 Groove
142 Third Wall
144 Dashed Lines
200 Pivot Ring
202 First Annular Segment
204 First Pivot Portion
206 Second Annular Segment
208 Second Pivot Portion
210 Radial Segment
212 Protrusions
214 Curved Segment
216 Curved Segment
218 Radial Distance
220 Axial Distance
300 Pivot Ring
302 First Annular Segment
304 First Pivot Portion
306 Second Annular Segment
308 Second Pivot Portion
310 Radial Segment
312 Protrusions
314 Curved Segment
316 Curved Segment
318 Radial Distance
320 Axial Distance
400 Pivot Ring
402 First Annular Segment
404 First Pivot Portion
506 Second Annular Segment
408 Second Pivot Portion
410 Radial Segment
412 Protrusions
414 Protrusions
416 Curved Segment
418 Curved Segment
420 Radial Distance
422 Axial Distance
500 Pivot Ring
502 First Annular Segment
504 First Pivot Portion
506 Second Annular Segment
508 Second Pivot Portion
510 Radial Segment

What is claimed:

1. A pivot ring for a clutch, comprising:
a first annular segment, a second annular segment and a radial segment,
the first annular segment having a first face on a front side of the ring and the second annular segment having a second face, predominately opposing the first face, on a back side of the ring, the radial segment disposed between the first annular segment and the second annular segment, connecting the first annular segment and the second annular segment,
the pivot ring being insertable between a pressure plate and a diaphragm spring of the clutch such that the first face contacts the diaphragm spring and the second face contacts the pressure plate, the pivot ring being configured so that tapering of the pressure plate when the pressure plate is overheated is allowed to occur without changing a diameter at which the first face contacts the diaphragm spring,
wherein at least one of the first and second annular segments has protrusions.

2. The pivot ring of claim 1, wherein at least one of the first and second annular segments has an unbroken outer periphery.

3. The pivot ring of claim 1, wherein the first and second annular segments are of different lengths and the second annular segment is shorter than the first annular segment.

4. The pivot ring of claim 1, wherein the first annular segment is radially offset outwardly from the second annular segment.

5. A pivot ring for a clutch, comprising:
a first annular segment, a second annular segment and a radial segment,
and the second annular segment having a first face on a front side of the ring and the second annular segment having a second face, predominately opposing the first face, on a back side of the ring, the radial segment disposed between the first annular segment and the second annular segment, connecting the first annular segment and the second annular segment,
the pivot ring being insertable between a pressure plate and a diaphragm spring of the clutch such that the first face contacts the diaphragm spring and the second face contacts the pressure plate, the pivot ring being configured so that tapering of the pressure plate when the pressure plate is overheated is allowed to occur without changing a diameter at which the first face contacts the diaphragm spring,
wherein the first and second annular segments have axially extending pivot portions.

6. The pivot ring of claim 5, wherein the portions are arcuately shaped, triangularly shaped, hyperbolically shaped, or oval shaped.

7. A clutch assembly, comprising:
a pressure plate having a recess;
a diaphragm spring; and
a pivot ring disposed between the pressure plate and the diaphragm spring,
the pivot ring having a first annular segment, a second annular segment and a radial segment, the first annular segment having a first face on a front side of the ring, which contacts the diaphragm spring and the second annular segment having a second face on a back side of the ring, predominately opposing the first face, which contacts the pressure plate, the radial segment disposed between the first annular segment and the second annular segment, connecting the first annular segment and the second annular segment,
the pivot ring being configured so that tapering of the pressure plate when the pressure plate is overheated is allowed to occur without changing a diameter at which the second face contacts the diaphragm spring,
wherein at least one of the first and second annular segments has protrusions.

8. The pivot ring of claim 7, wherein at least one of the first and the second annular segments has an unbroken outer periphery.

9. The clutch assembly of claim 7, wherein the first and second annular segments are of different lengths and the second annular segment is shorter than the first annular segment.

10. The clutch assembly of claim 7, wherein the first annular segment is radially offset outwardly from the second annular segment.

11. The clutch of claim 7, wherein the pressure plate has a radial friction surface which is engageable with a clutch disk and transmits torque to a transmission of a vehicle and axially opposing the radial friction surface, the pressure plate has at least a first surface which is spaced apart from at least a second surface by the recess, the radial friction surface and the first surface and the second surface tapering when overheated and the pivot ring being contactable with the pressure plate proximately at the recess.

12. The clutch assembly of claim 7, wherein the pivot ring transmits an axial force from the diaphragm spring onto the pressure plate.

13. A clutch assembly, comprising:
a pressure plate having a recess;
a diaphragm spring; and
a pivot ring disposed between the pressure plate and the diaphragm spring,
the pivot ring having a annular segment, a second annular segment and a radial segment, the first annular segment having a first face on a front side of the ring, which contacts the diaphragm spring and the second annular segment having a second face on a back side of the ring, predominately opposing the first face, which contacts the pressure plate, the radial segment disposed between the first annular segment and the second annular segment, connecting the first annular segment and the second annular segment,
wherein the first and second annular segments have axially extending pivot portions.

14. The clutch assembly of claim 13, wherein the portions are arcuately shaped, triangularly shaped, hyperbolically shaped, or have an oval shape.

15. A clutch assembly, comprising:
a pressure plate having a recess;
a diaphragm spring; and
a pivot ring disposed between the pressure plate and the diaphragm spring,
the pivot ring having a first annular segment, a second annular segment and a radial segment, the first annular segment having a first face on a front side of the ring, which contacts the diaphragm spring and the second annular segment having a second face on a back side of the ring, predominately opposing the first face, which contacts the pressure plate, the radial segment disposed between the first annular segment and the second annular segment, connecting the first annular segment and the second annular segment,
wherein the pressure plate has a radial friction surface which is engageable with a clutch disk and transmits torque to a transmission of a vehicle and axially opposing the radial friction surface, the pressure plate has at least a first surface which is spaced apart from at least a second surface by the recess, the radial friction surface and the first surface and the second surface tapering when overheated and the pivot ring being contactable with the pressure plate proximately at the recess, and
wherein the recess, which is located between the first surface and the second surface of the pressure plate, has a first wall extending from the first surface, a second wall extending radially inward from the first side wall, toward an axis of rotation of the clutch assembly, a groove formed at an axially innermost edge of the second wall, and a third wall extending away from the groove, toward the second surface.

16. The clutch assembly of claim 15, wherein at least the radial segment is disposed within the recess and the second annular segment is disposed within the groove of the recess.

17. A clutch assembly, comprising:
a pressure plate having a recess;
a diaphragm spring; and
a pivot ring disposed between the pressure plate and the diaphragm spring,
the pivot ring having a first annular segment, a second annular segment and a radial segment, the first annular segment having a first face on a front side of the ring, which contacts the diaphragm spring and the second annular segment having a second face on a back side of the ring, predominately opposing the first face, which contacts the pressure plate, the radial segment disposed between the first annular segment and the second annular segment, connecting the first annular segment and the second annular segment,
wherein the clutch assembly further comprises a sensor ring with apertures and axially extending projections of the first annular segment project through the apertures in the sensor ring.

* * * * *